US009335533B2

(12) United States Patent
Kennedy et al.

(10) Patent No.: US 9,335,533 B2
(45) Date of Patent: May 10, 2016

(54) ADJUSTABLE TOTAL INTERNAL REFLECTANCE MICROSCOPY (TIRFM) ILLUMINATOR APPARATUS

(75) Inventors: Guy Kennedy, Underhill Center, VT (US); David M. Warshaw, South Burlington, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 113 days.

(21) Appl. No.: 13/879,404

(22) PCT Filed: Oct. 13, 2011

(86) PCT No.: PCT/US2011/056089
§ 371 (c)(1),
(2), (4) Date: Aug. 12, 2013

(87) PCT Pub. No.: WO2012/051383
PCT Pub. Date: Apr. 19, 2012

(65) Prior Publication Data
US 2013/0321907 A1    Dec. 5, 2013

Related U.S. Application Data

(60) Provisional application No. 61/392,566, filed on Oct. 13, 2010.

(51) Int. Cl.
| G02B 21/06 | (2006.01) |
| G02B 21/08 | (2006.01) |
| G02B 21/00 | (2006.01) |
| G02B 7/00  | (2006.01) |

(52) U.S. Cl.
CPC .............. *G02B 21/06* (2013.01); *G02B 21/00* (2013.01); *G02B 21/08* (2013.01); *G02B 21/082* (2013.01); *G02B 21/084* (2013.01); *G02B 7/003* (2013.01)

(58) Field of Classification Search
CPC ...... G02B 21/00; G02B 21/08; G02B 21/084; G02B 21/06; G02B 21/082; G02B 7/003
USPC .......................................... 359/379, 389, 392
See application file for complete search history.

(56) References Cited

U.S. PATENT DOCUMENTS

| 7,385,758 | B2* | 6/2008 | Aono et al. ................... 359/390 |
| 2006/0103922 | A1* | 5/2006 | Tsuyuki ........................ 359/383 |
| 2008/0266659 | A1* | 10/2008 | Ulrich et al. .................. 359/387 |
| 2009/0191619 | A1* | 7/2009 | Eisfeld et al. .............. 435/288.7 |

* cited by examiner

*Primary Examiner* — Bumsuk Won
*Assistant Examiner* — William R Alexander

(57) ABSTRACT

A new apparatus and method of delivering light to the hack aperture of a High Numerical Aperture (NA) Microscopy Objective lens for Total Internal Reflectance Microscopy (TIRFM) is provided. The apparatus and method include pumping light generated by a laser through an optical fiber which is optically coupled to the objective lens by a collimating optical element, such as, for example a lens or prism. The apparatus and method also include providing a fiber axial translator which is mechanically adjustable for focusing the laser light optically coupled to the objective lens. The apparatus also includes a mechanical coupler for mechanically coupling the apparatus to the object lens such that the laser light optically coupled to the objective lens can be adjusted to exceed, or not exceed, a critical angle associated with TIRFM illumination.

16 Claims, 6 Drawing Sheets

ADJUSTABLE TOTAL INTERNAL REFLECTANCE MICROSCOPY (TIRFM) ILLUMINATOR APPARATUS

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available, effective filing date(s) from, and also incorporates by reference in its entirety all subject matter of any and all parent, grandparent, great-grandparent, etc. applications of the Related Application(s) to the extent such subject matter is not inconsistent herewith.
1. U.S. provisional patent application 61/392,566 entitled "Micro Optic Fiber Launch TIRFM", naming Guy G. Kennedy and David Warshaw as inventors, filed Oct. 13, 2010.

BACKGROUND

1. Field of Use

These teachings relate generally to a system and method for microscopy illumination in general and more particularly to an adjustable TIRFM illumination apparatus.

2. Description of Prior Art

Various mechanisms are often employed in fluorescence microscopy applications to restrict the excitation and detection of fluorophores to a thin region of the specimen. Elimination of background fluorescence from outside the focal plane can dramatically improve the signal-to-noise ratio, and consequently, the spatial resolution of the features or events of interest. Total internal reflection fluorescence microscopy (TIRFM) exploits the unique properties of an induced evanescent wave or field in a limited specimen region immediately adjacent to the interface between two media having different refractive indices. In practice, the most commonly utilized interface in the application of TIRFM is the contact area between a specimen and a glass cover-slip or tissue culture container. A collimated light beam propagating through one medium and reaching, such an interface is either refracted as it enters the second medium, or reflected at the interface, depending upon the incident angle and the difference in refractive indices of the two media. Total internal reflection is only possible in situations in which the propagating light encounters a boundary to a medium of lower refractive index. Its refractive behavior is governed by the well known Snell's Law.

Although light no longer passes into the second medium when it is incident at angles greater than the critical angle, the reflected light generates a highly restricted electromagnetic field adjacent to the interface, in the lower-index medium. This evanescent field is identical in frequency to the incident light, and because it decays exponentially in intensity with distance from the interface, the field extends at most a few hundred nanometers into the specimen in the z direction (normal to the interface).

In a typical experimental setup, fluorophores located in the vicinity of the glass-liquid or plastic-liquid surface can be excited by the evanescent field, provided they have potential electronic transitions at energies within or very near the wavelength bandwidth of the illuminating beam. Because of the exponential falloff of evanescent field intensity, the excitation of fluorophores is restricted to a region that is typically less than 100 nanometers in thickness. By comparison, this optical section thickness is approximately one-tenth that produced by confocal fluorescence microscopy techniques. Because excitation of fluorophores in the bulk of the specimen is avoided, confining the secondary fluorescence emission to a very thin region, a much higher signal-to-noise ratio is achieved compared to conventional wide field epifluorescence illumination. This enhanced signal level makes it possible to detect single-molecule fluorescence by the TIRFM method.

Generally, two types of TIRF illumination are known in the prior art. The first prior art illumination is by means of a prism. The fluorescence is collected through an objective and is formed at a charge-coupled-device (CCD) camera. It is understood that the TIRF illumination is performed on the side pointing away from the objective. This has the disadvantage that the specimen to be studied has to be prepared on the prism, because the evanescent lighting field is excited at the boundary surface between the prism and the specimen. This type of preparation is expensive. In contrast thereto, specimens are prepared as a rule on a thin cover glass. The sample is generally prepared on a glass surface coupled to the prism using a coupling medium of glycerol, or oil. This is an inconvenient method and difficult to set up and align. It typically restricts the sample from Brightfield imaging.

In the second type of TIRF illumination disclosed, for example in FIG. 9 of WO 20061127692 A2, the specimen can be prepared by a standard procedure on a cover glass because here the TIRF illumination is performed through the microscope objective.

Typically, however, this arrangement has had the disadvantage that the microscope objective has to possess a high numerical aperture in order to make it possible to have a large angle of incidence necessary for high resolution for the excitation light T. As a result, there are increased demands upon the glasses used whereby the number of glass types available is reduced. For example, immersion media and front lenses with a correspondingly higher index of refraction have to be used. In addition, the number of lenses for image correction has to be increased, as a rule, so that manufacturing expense rises and transmission decreases. If the specimen for the TIRF excitation is illuminated with different light wavelengths, so must the angle of incidence, in order to guarantee a high resolution, for all the wavelengths to be identical, the complexity of the microscope and with it its manufacturing expense increase further.

Although there were disadvantages to through the lens TIRF the challenges stated are generally well addressed in current objective lens design. While through the lens TIRF is not as pure as Prism type TIRF due to internal reflections and auto fluorescence within the objective lens assembly, in practice they perform extremely well.

However, commercial solutions to implement these new lenses into microscopy systems have been thus far complex and expensive; using a light path which is either common or redundant to an EPI illumination light path.

For example, referring to FIG. 1 there is shown a schematic diagram illustrating prior art conventional TIRF combined with Far field fluorescence. The prior art configuration shown in FIG. 1 includes objective lens 92, dichromatic assembly 94, prism 910, camera 912, a conventional TIRF assembly 930, and an EPI Lamp assembly 79.

The dichromatic assembly 94 comprises fixed filters 95,96 and dichromatic mirror 97. The simplified representation of the conventional TIRF assembly 930 includes lenses 89a, 89b, and 89c. Also shown is a laser source 89d. Similarly the EPI Lamp assembly 79 includes lenses 79a and 79b. The assembly also includes a light source 79c and reflector 79d.

Still referring to FIG. 1 it can be seen that the emitted light paths for the camera 912, the TIRF assembly 930, represented by 91c, 91d and 91e, 91f, respectively are redundant to the EPI light paths generated by the EPI Lamp assembly 79 (not shown for clarity).

Thus, it will be readily appreciated that prior art solutions are complex, as well as expensive. In order to have both TIRF and Far field fluorescence capability, the hardware associated with each capability needs be stacked, one over the other. This adds redundancy to the optical path and about 3 inches to the height of a microscope.

Therefore, there exists a need for a robust, but less complex, adjustable TIRFM illuminator apparatus

BRIEF SUMMARY

The foregoing and other problems are overcome, and other advantages are realized, in accordance with the presently preferred embodiments of these teachings.

In accordance with one embodiment of the present invention an adjustable total internal reflectance microscopy (TIRFM) illuminator apparatus is provided. The apparatus includes an optical fiber for transmitting an optical light wavelength and a fiber axial translator for focusing the optical light wavelength. The fiber axial translator is mechanically adjustable in at least one-degree-of freedom for focusing the optical wavelength. The apparatus also includes at least collimating optical element connectable to the at least optical fiber for optically coupling, the optical light wavelength to an objective lens.

The invention is also directed towards a method for optically coupling light to the back aperture of a high numerical aperture microscopy objective lens for total internal reflectance microscopy (TIRFM). The method includes pumping a light wavelength through an optical fiber and providing an optical element for optically collimating and coupling the light wavelength to the objective lens. The method also includes providing a fiber axial translator connected to the at least one optical fiber, wherein the fiber axial translator is adapted to focus the at least one light wavelength optically coupled to the objective lens. The method further includes mechanically coupling the apparatus to the objective lens and adjusting the mechanical coupling such that the light wavelength exceeds or does not exceed a critical angle associated with TIRFM illumination.

In accordance with another embodiment of the present invention an apparatus an adjustable total internal reflectance microscopy (TIRFM) illuminator apparatus is provided. The apparatus includes an objective lens adaptable to TIRFM and an optical fiber for transmitting an optical light wavelength. Also provided is a fiber axial translator. The fiber axial translator is mechanically adjustable in at least one-degree-of freedom for focusing the optical light wavelength through the objective lens. The apparatus includes a collimating optical element connectable to the optical fiber for coupling the focused light to the objective lens. Further provided is a mechanical coupling for coupling the fiber, translator and optical element to the objective lens. The mechanical coupling is adjustable in at least one degree of freedom to adjust the optical light wavelength to exceed, or not exceed a critical angle of incidence associated with TIRFM illumination.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
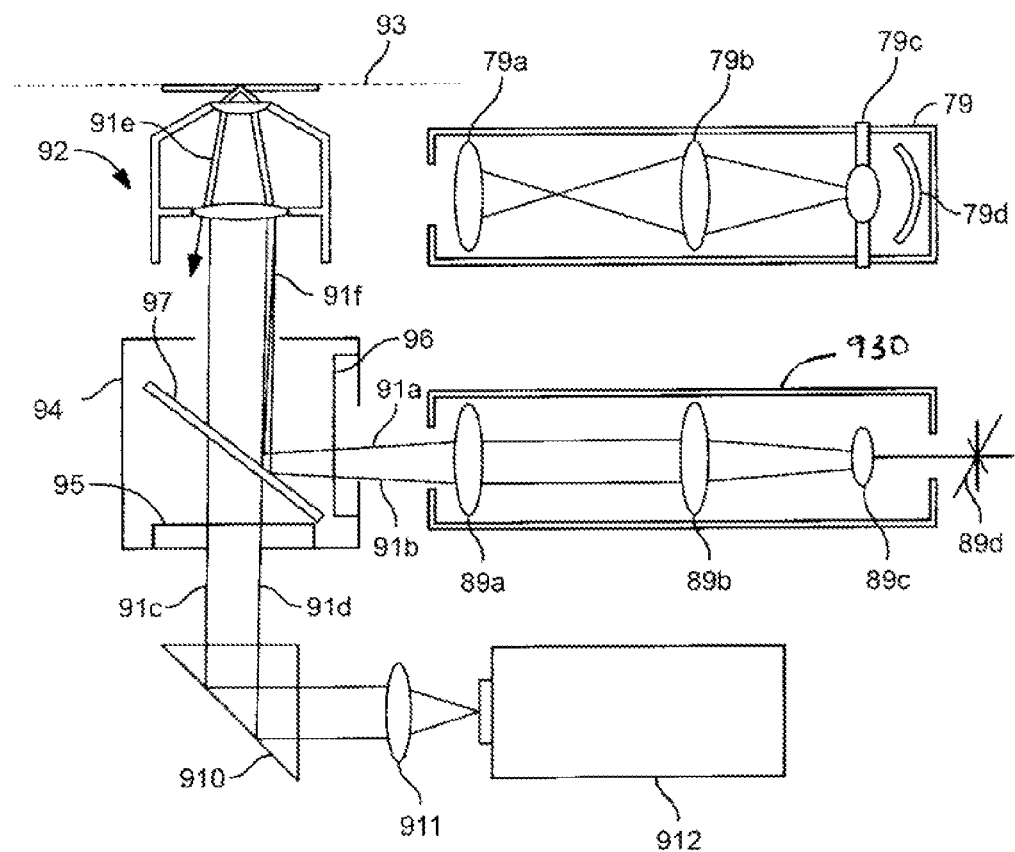
FIG. 1 is a schematic diagram illustrating prior an conventional TIRF combined with Far field fluorescence.
Figure 2:
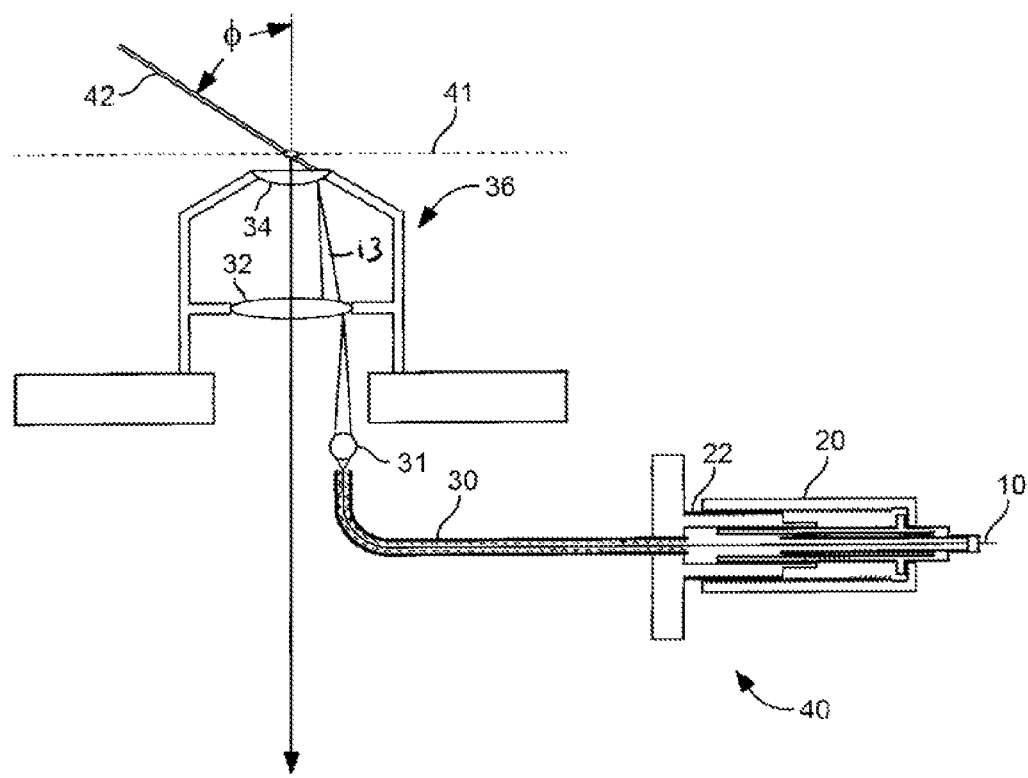
FIG. 2 is a schematic diagram illustrating an adjustable total internal reflectance microscopy (TIRFM) illuminator apparatus invention described herein.

Referring now to FIG. 2 there is shown a schematic diagram illustrating an adjustable total internal reflectance microscopy (TIRFM) illuminator apparatus invention described herein. It will be understood that any suitable microscope or microscopy system may be used in accordance with the present invention.

Still referring to FIG. 2, the adjustable total internal reflectance microscopy (TIRFM) illuminator apparatus 40 includes optical fiber 10, scaffolding tubing 30 to hold internal tubing and fiber optic 10, ball lens 31, and linear translator components 20, 22. It will be appreciated that optical fiber 10 may be any suitable optical fiber, including, but not limned to, polarization-maintaining optical fiber.

Also shown in FIG. 2 is objective lens 36, image plane 41, refracted light 42. Objective lens 36 includes back aperture lens 32 and front lens 34. It will be understood, that in its simplest operation laser light 13 is refracted first by back aperture lens 32 and then by front lens 34 such that refracted light 42 does not pass into a second medium (e.g., sample slide) when it is incident at angles greater than the critical angle and is reflected by the second medium; however, the reflected light generates a highly restricted electromagnetic field adjacent to the interface, in the lower-index medium. This evanescent field is identical in frequency to the incident light, and because it decays exponentially in intensity with distance from the interface, the field extends at most a few hundred nanometers into the specimen in the z direction (normal to the interface). In practice the "second medium" is typically preceded by refractive index matching oil, then a glass sample slide, and then it is reflected at the glass/water interface. There could be two or more mediums for the light to transmit through before it reaches an interface for total internal reflection.

As noted earlier, because of the exponential falloff of evanescent, field intensity, the excitation of fluorophores is restricted to a region that is typically less than 100 nanometers in thickness. Typically, this optical section thickness is approximately one-tenth that produced by confocal fluorescence microscopy techniques; and, because excitation of fluorophores in the bulk of the specimen is avoided, confining the secondary fluorescence emission to a very thin region, a much higher signal-to-noise ratio is achieved compared to conventional wide field epifluorescence illumination. This enhanced signal level makes it possible to detect single-molecule fluorescence by the TIRFM method.

Still referring to FIG. 2, it will be appreciated that by spatially adjusting the horizontal relationship between linear translator components 20, 22 the wavelengths (because the fiber can transmit multiple wavelengths at the same time) and frequency of the incident light 42, and therefore the penetration depth of the evanescent field and subsequent fluorophores excitation region, is changeable and focusable. The linear translator components 20, 22 primarily changes the size of the light bundle impinging on the back aperture of the objective lens also affecting the size of the illumination area on the sample slide. Translating the whole apparatus 40, will change where the light bundle impinges on the back aperture and thus alter the TIR angle which controls the TIRF penetration depth.

It will also be appreciated that system may be adjusted such that the laser light does not meet the critical angle for TIR illumination or the location of TIR within the field of view. This benefit feature allows for partial TIR, EPI fluorescence, and Darkfield illumination. The TIR adjustment capacity in the location in the field of view, TIR focus capacity, and TIR angle adjustment are important distinctions and improvements over prior systems with dedicated systems.

Still referring to FIG. 2, it will be appreciated that ball lens 31 may be any suitable collimating optical element, such as, for example, but not restricted, to, a ball lens or a half ball lens.

Figure 3:
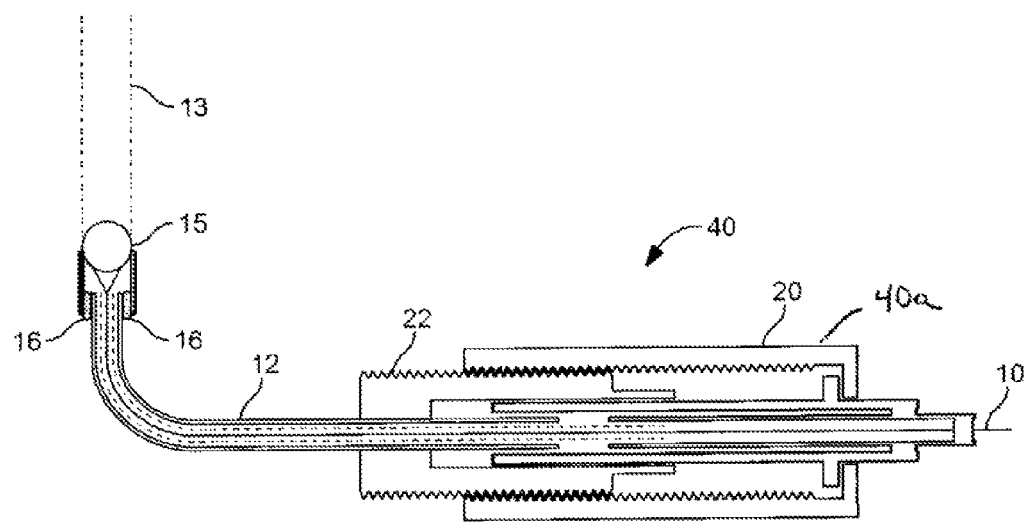
FIG. 3 is a schematic diagram illustrating fiber axial translation in accordance with the invention shown in FIG. 2.

Referring also to FIG. 3, there is shown a schematic diagram illustrating fiber axial translation in accordance with the invention shown in FIG. 2. As shown, item 20 and item 22 are components of the fiber axial translator 40a for linear translation of the fiber; or, in other words, used to focus the laser light 13 emitted by ball lens assembly 15. It will be appreciated that any suitable linear translator could be used. Lens assembly 16 is fastened to tubing 12 by means of a suitable adhesive 16.

Figure 4:
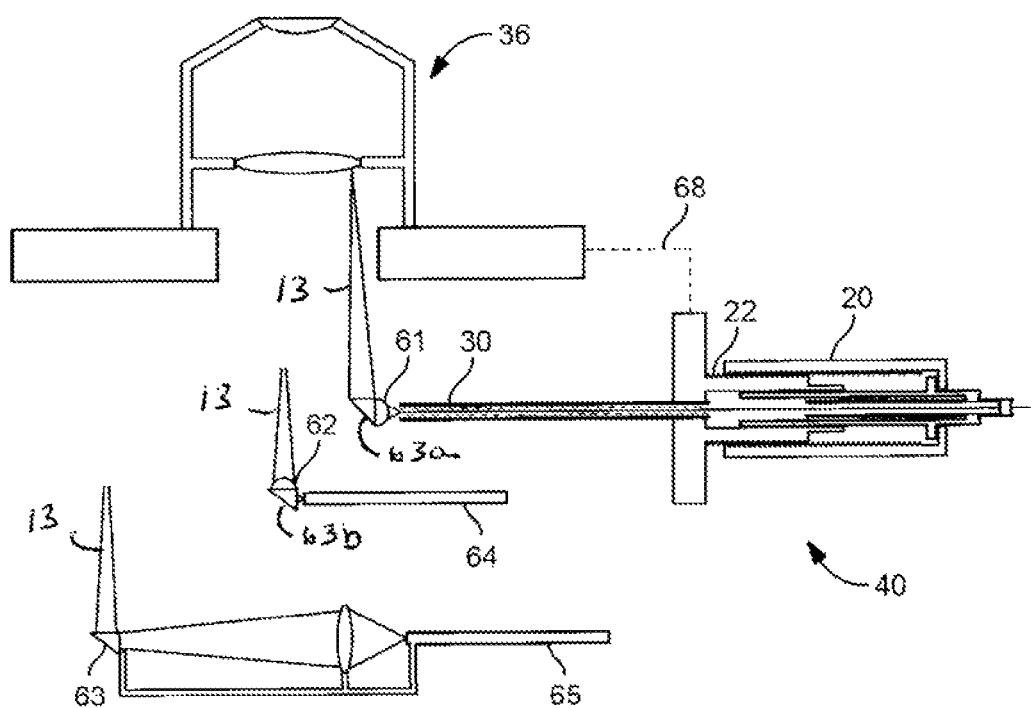
FIG. 4 is a schematic diagram illustrating alternative optical configurations with additional micro optics in accordance with the invention shown in FIG. 2.

Referring also to FIG. 4, there is shown a schematic diagram illustrating alternative optical configurations with additional micro optics in accordance with the invention shown in FIG. 2. FIG. 4 illustrates alternative configurations using lenses, and micro optics to refract the light such that it aligns to the optical axis of the microscope.

Still referring to FIG. 4, the objective lens assembly 36 is optically coupled to half ball lens 61 through micro prism 63a. Alternatively, objective lens assembly may be optically coupled to micro prism 63b through half ball lens 62 with light from fiber optic contained within housing 64 impinging on prism 63b first and supporting the lens assembly. In alternate configurations prisms 63, 63a, and 63b could be substituted with a suitable micro mirror.

Still referring to FIG. 4, dashed line 68 represents the mechanical coupling between the adjustable TIRFM illuminator apparatus 40 and objective lens assembly 36. It will be appreciated that mechanical coupling between the adjustable TIRFM illuminator apparatus 40 and objective lens assembly 36 ensures alignment of the light is stabile when the objective lens 36 (or sample) is translated during focusing.

It will be appreciated that a novel feature of the present invention lies in the mechanical coupling 68 which is adapted to mechanically translated the adjustable TIRFM illuminator apparatus 40 perpendicular to the objective lens optical axis to adjust the angle of incidence at the glass/water interface (see FIG. 2, X axis 41). This feature enables "Farfield TIRF" also known as "Dirty TIRF", and also simple Farfield fluorescence without TIRF.

As noted earlier, prior art solutions combined multiple mirrors on to one substrate. This multi reflective point mirror is a specific design to work with particular objective lens geometry. Such a mirror requires alignment between the objective lens, and associated light beams. This design limits laser alignment to a narrow region determined by the mirror design. In contrast, the present invention does not require a separately mounted and aligned mirror as the light is directed directly from the adjustable TIRFM illuminator apparatus 40 to the objective lens 36.

Figure 5:
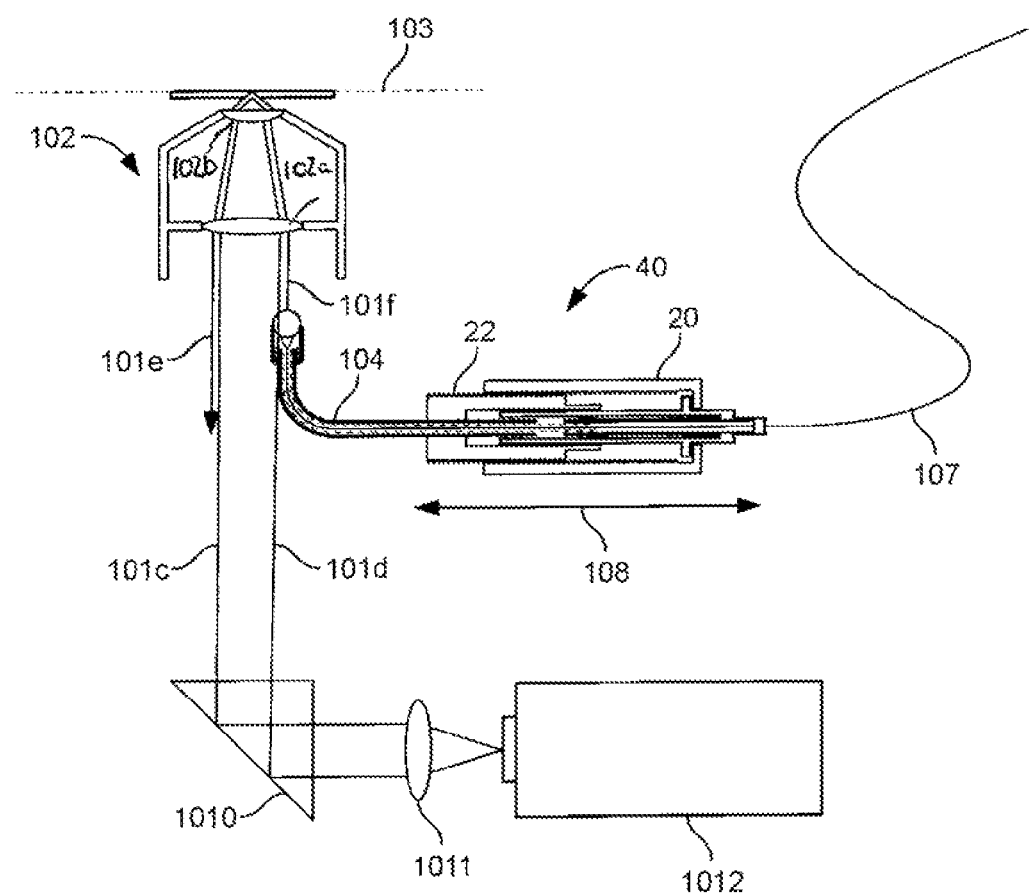
FIG. 5 is a schematic diagram illustrating an alternate configuration of the TIRFM illuminator apparatus in accordance with the invention shown in FIG. 2.

Referring also to FIG. 5, there is shown a schematic diagram illustrating an alternate configuration of the TIRFM illuminator apparatus 40 in accordance with the invention shown in FIG. 2. The configuration shown in FIG. 5 includes objective lens 102, prism 1010, camera 1012, focus lens 1011, fiber 107, and adjustable TIRFM illuminator apparatus 40.

Still referring to FIG. 5 it can be seen that the emitted light paths for the camera 1012, adjustable TIRFM illuminator apparatus 40, represented by 101c, 101d and 101e, 101f, respectively, are independent light paths. Also shown is adjustor 108. Adjustor 108 translates the TIRFM illuminator apparatus 40 horizontally to adjust the point where the light 101f impinges upon the back aperture of the objective lens 102a. This adjustment makes it easier for the user to adjust the TURF angle with respect to the X-axis 103, and reinforces a feature not possible with the prior art fixed mirror approach. It is understood that adjustor 108 can adjust one or more degrees-of-freedom, e.g., x-y, pitch, yaw, and roll, in addition to focus.

Figure 6:
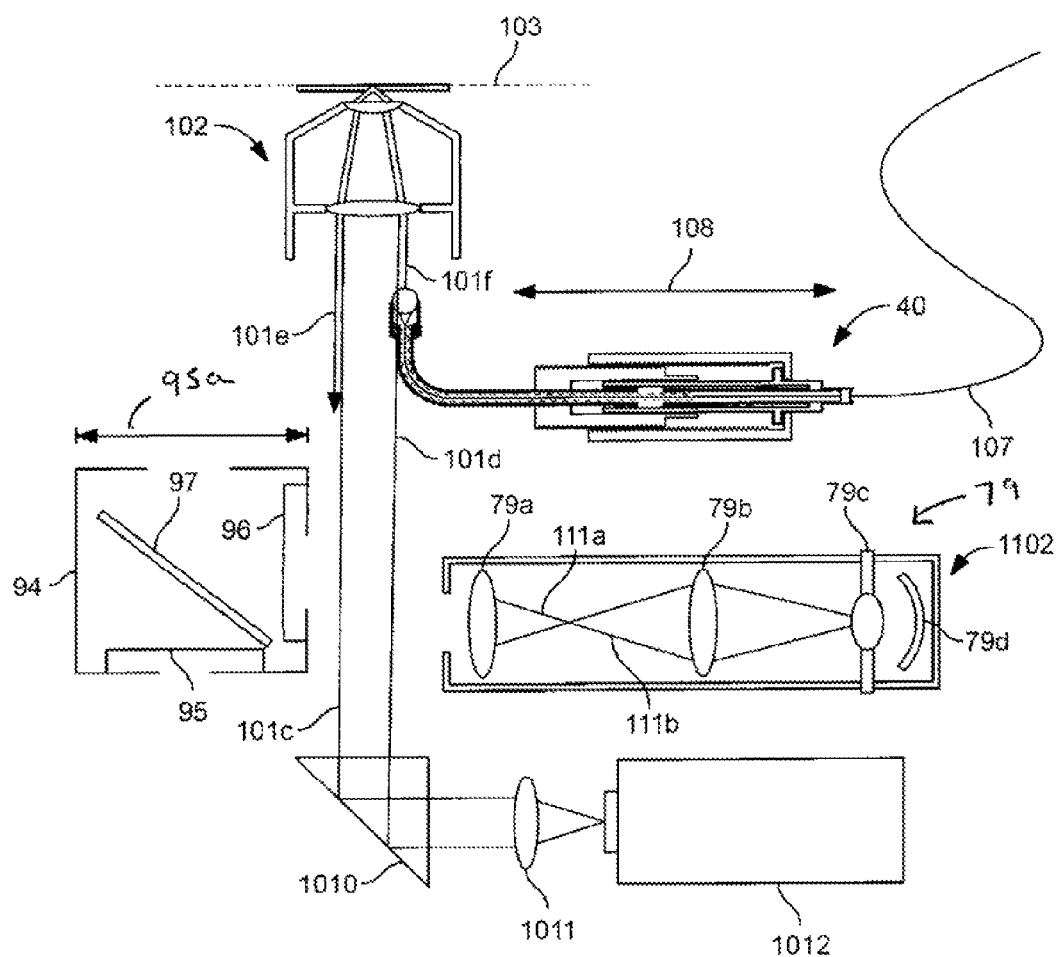
FIG. 6 is a schematic diagram illustrating another alternate configuration of the TIRFM illuminator apparatus in accordance with the invention shown in FIG. 2.

Referring also to FIG. 6 there is shown a schematic diagram illustrating another alternate configuration of the TIRFM illuminator apparatus in accordance with the invention shown in FIG. 2. The configuration shown in FIG. 6 includes dichromatic mirror assembly 94, objective lens 102, prism 1010, camera 1012, focus lens 1011, fiber 107, adjustable TIRFM illuminator apparatus 40, adjustor 108, and an EPI Illuminator assembly 79.

The dichromatic assembly 94 comprises fixed filters 95,96 and dichromatic mirror 97. The EPI Lamp assembly 79 includes lenses 79a and 79b. The assembly 79 also includes a light source 79c and reflector 79d.

It will be appreciated that the invention disclosed herein presents several advantages over prior art solutions. For example, the adjustable TIRFM illuminator apparatus 40 with mechanical coupling to the objective lens assembly provides: adjustable focus control to change the fluorescence field of view; translates with the objective lens; dichromatic mirrors are not required; excitation filters are not required; allows conventional bright-field, and EPI fluorescence light path to be used, even simultaneously; small efficient design can be integrated into existing; inexpensive construction; and multiple wavelength excitation light possible. Likewise, the disclosed invention also eliminates the need to have the objective lens designed as a dedicated lens for only a very specific imaging purpose. For example, this could be a limitation if the light were brought to the from of the objective lens, rather than the back of the objective lens.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims For example; a microscope may be equipped with several adjustable TIRFM apparatuses as disclosed herein. They may be used simultaneously, or individually. This may prove useful when requiring polarization control or when a single optical fiber limits wavelength bandwidth. Similarly, light sources such as Light Emitting Diodes and LASERS may be miniaturized and integrated with a micro lens.

What is claimed is:

1. An adjustable total internal reflectance microscopy (TIRFM) illuminator apparatus, the apparatus comprising:
    an objective lens wherein the objective lens comprises:
        an optical axis,
        an outer circumference;
        inner circumference
    at least one optical fiber, wherein the at least one optical fiber is adaptable to transmit at least one optical excitation light wavelength through the outer circumference of the objective lens;
    at least one fiber axial translator for focusing the at least one optical excitation light wavelength, wherein the at least one fiber axial translator is mechanically adjustable in at least one-degree of freedom;
    at least one collimating optical element connectable to the at least optical fiber for impinging the at least one optical excitation light wavelength on to the optical axis wherein the at least one collimating optical element comprises at least one optical prism adaptable to impinge the at least one optical excitation light wavelength on to the optical axis through the outer circumference of the objective lens;
    wherein the objective lens is adaptable to transmit emission light wavelength through the inner circumference of the objective lens; and
    said TIRFM illuminator apparatus not including a dichroic mirror for impinging the at least one optical excitation light wavelength on to the optical axis.

2. The apparatus as in claim 1 wherein the at least one collimating optical element comprises at least one ball lens adaptable to impinge the at least one optical excitation light wavelength on to the optical axis through the outer circumference of the objective lens.

3. The apparatus as in claim 1 wherein the at least one optical element comprises at least one half ball lens adaptable to impinge the at least one optical excitation light wavelength on to the optical axis through the outer circumference of the objective lens.

4. The apparatus as in claim 1 wherein the apparatus further comprises an adjustable focus controller adaptable to change the fluorescence field of view.

5. The apparatus as in claim 4 wherein the apparatus further comprises a mechanical coupling for coupling the apparatus to the objective lens.

6. The apparatus as in claim 5 wherein the mechanical coupling is adaptable to adjusting the apparatus in at least one degree of freedom.

7. The apparatus as in claim 4 further comprising at least one charge-coupled-device optically coupled to the objective lens.

8. The apparatus as in claim 1 further comprising at least one laser light source for transmitting the at least one optical excitation light wavelength.

9. A method for optically coupling focused light to the back aperture of a high numerical aperture microscopy objective lens having an inner and outer circumference for total internal reflectance microscopy (TIRFM), the method comprising:
    pumping at least one excitation light wavelength through at least one optical fiber; providing an optical element for optically collimating and coupling the at least one excitation light wavelength to the outer circumference of the objective lens; and
    providing a fiber axial translator connected to the at least one optical fiber, wherein the fiber axial translator is adapted to focus the at least one excitation light wavelength optically coupled to the outer circumference of the objective lens; and
    adjusting the optically coupled excitation light to exceed a critical angle of optical incidence associated with TIRFM illumination.

10. The method as in claim 9 further comprising adjusting the optically coupled excitation light to not exceed a critical angle of optical incidence associated with TIRFM illumination.

11. The method as in claim 9 further comprising providing a mechanical coupling between the optical element and the objective lens wherein the mechanical coupling is adjustable in at least one-degree of freedom.

12. The method as in claim 11 further comprising providing the mechanical coupling between the optical element and the objective lens wherein the mechanical coupling is adjustable in x-y, pitch, yaw, and roll.

13. An adjustable total internal reflectance microscopy (TIRFM) illuminator apparatus, the apparatus comprising:
    an objective lens having an optical axis and adaptable to TIRFM, wherein the objective lens comprises:
        inner circumference
        an outer circumference;
    at least one optical fiber adaptable to transmit at least one optical excitation light wavelength through the outer circumference;
    at least one fiber axial translator adaptable to focus the at least one optical excitation light wavelength through the outer circumference, wherein the at least one fiber axial translator is mechanically adjustable in at least one-degree-of freedom;
    at least one collimating optical element connectable to the at least one optical fiber for coupling the focused excitation light wavelength to the objective lens optical axis;
    said TIRFM illuminator apparatus not including a dichroic mirror for coupling the at least one optical light wavelength to the optical axis;
    wherein the apparatus further comprises a mechanical coupling for coupling the apparatus to the objective lens; and
    wherein the apparatus is adaptable in at least one degree of freedom to optically couple the focused excitation light wavelength through the outer circumference to exceed a critical angle of optical incidence with TIRFM illumination.

14. The apparatus as in claim 13 wherein the mechanical coupling is adaptable to adjusting the apparatus in at least one degree of freedom.

15. The apparatus as in claim 13 wherein the apparatus is adaptable in at least one degree of freedom to optically couple the focused excitation light wavelength through the outer circumference to not exceed a critical angle of optical incidence associated with TIRFM illumination.

16. An adjustable total internal reflectance microscopy (TIRFM) illuminator and Farfield fluorescence apparatus, the apparatus comprising:
    an objective lens, wherein the objective lens comprises:
        an optical axis;
        an outer circumference;
        an inner circumference;

at least one optical fiber for transmitting at least one optical excitation light wavelength;

an adjustable focus controller adaptable to change the fluorescence field of view, wherein the adjustable focus controller comprises:

at least one fiber axial translator for focusing the at least one optical excitation light wavelength, wherein the at least one fiber axial translator is mechanically adjustable in at least one-degree-of freedom;

at least one collimating optical element connectable to the at least optical fiber for impinging the focused optical excitation light wavelength through the outer circumference; wherein the at least one optical element comprises at least one optical prism adaptable to impinge the at least one optical excitation light wavelength on to the optical axis through the outer circumference of the objective lens; and said TIRFM illuminator and Farfield fluorescence apparatus not including a dichroic mirror for impinging the at least one optical wavelength on to the optical axis.

* * * * *